(12) United States Patent
Kapteyn

(10) Patent No.: US 7,370,500 B2
(45) Date of Patent: May 13, 2008

(54) INTEGRATED CENTER STACK ELECTRONIC MODULE RETENTION SYSTEM

(75) Inventor: Kelvin L. Kapteyn, Troy, MI (US)

(73) Assignee: Collins & Aikman Products Co., Southfield, MI (US)

( * ) Notice: Subject to any disclaimer, the term of this patent is extended or adjusted under 35 U.S.C. 154(b) by 296 days.

(21) Appl. No.: 10/877,934

(22) Filed: Jun. 25, 2004

(65) Prior Publication Data

US 2005/0050927 A1   Mar. 10, 2005

Related U.S. Application Data

(63) Continuation-in-part of application No. 10/610,430, filed on Jun. 30, 2003, now Pat. No. 7,040,686.

(60) Provisional application No. 60/392,085, filed on Jun. 28, 2002.

(51) Int. Cl.
*B60R 25/00* (2006.01)

(52) U.S. Cl. .................. 70/237; 70/14; 70/58; 70/466; 296/70; 296/72; 248/27.3

(58) Field of Classification Search .............. 70/14, 70/466, 57, 58, 158–169, 237; 248/27.3; 296/70, 72

See application file for complete search history.

(56) References Cited

U.S. PATENT DOCUMENTS

| | | | |
|---|---|---|---|
| 3,956,912 A | 5/1976 | Broska | 70/360 |
| 3,994,148 A * | 11/1976 | Anderson | 70/58 |
| 4,053,130 A | 10/1977 | Birkner | 248/27.3 |
| 4,066,307 A | 1/1978 | Barding | 312/242 |
| 4,081,978 A | 4/1978 | Ivey | 70/58 |
| 4,148,542 A | 4/1979 | Wood | 339/126 RS |
| 4,232,537 A * | 11/1980 | Plaiss | 70/233 |
| 4,313,584 A | 2/1982 | Fukunaga | 248/27.3 |
| 4,527,405 A | 7/1985 | Renick et al. | 70/14 |
| 4,553,414 A | 11/1985 | Caputo et al. | 70/58 |
| 4,640,106 A | 2/1987 | Derman | 70/14 |
| 4,717,195 A | 1/1988 | Okuyama et al. | 296/72 |
| 4,733,739 A | 3/1988 | Lorenz et al. | 180/90 |
| 4,747,570 A | 5/1988 | Takahashi | 248/309.1 |
| 4,856,304 A | 8/1989 | Derman | 70/14 |
| 4,867,398 A | 9/1989 | Butcher et al. | 248/27.3 |
| 4,993,668 A | 2/1991 | Inamura | 248/27.3 |
| 5,052,200 A | 10/1991 | Claar et al. | 70/123 |
| 5,088,571 A | 2/1992 | Burry et al. | 180/90 |
| 5,176,544 A | 1/1993 | AbuJudom, II et al. | 439/878 |
| 5,184,887 A | 2/1993 | O'Keefe et al. | 312/221 |
| 5,364,159 A | 11/1994 | Kelman et al. | 296/192 |
| 5,366,189 A | 11/1994 | Thompson | 248/27.3 |
| 5,381,684 A | 1/1995 | Kawamura | 70/58 |
| 5,387,023 A | 2/1995 | Deneau | 296/72 |
| 5,509,627 A | 4/1996 | Darrow et al. | 248/27.1 |
| 5,524,859 A | 6/1996 | Squires et al. | 248/551 |
| 5,556,153 A | 9/1996 | Kelman et al. | 296/70 |

(Continued)

*Primary Examiner*—Suzanne Dino Barrett
(74) *Attorney, Agent, or Firm*—Grossman, Tucker, Perreault & Pfleger, PLLC

(57) ABSTRACT

A vehicle interior trim panel comprising a mounting opening with opposing walls for slidably engaging a component into fixed relationship with the mounting opening wherein molded features in the walls of the mounting opening engage the component to align and fixedly retain the component in the mounting opening. In addition, a locking system for preventing theft is disclosed.

8 Claims, 12 Drawing Sheets

U.S. PATENT DOCUMENTS

| | | | |
|---|---|---|---|
| 5,560,572 A | 10/1996 | Osborn et al. | 248/27.3 |
| 5,564,769 A | 10/1996 | Deneau et al. | 296/72 |
| 5,597,461 A | 1/1997 | Pate | 204/286 |
| 5,610,376 A | 3/1997 | Takagi et al. | 200/50.01 |
| 5,645,340 A | 7/1997 | Colton | 362/80 |
| 5,676,338 A | 10/1997 | Warda et al. | 248/27.1 |
| 5,709,358 A | 1/1998 | Kubota | 248/27.1 |
| 5,779,197 A | 7/1998 | Kim | 248/27.1 |
| 5,805,420 A | 9/1998 | Burke | 361/727 |
| 5,806,354 A | 9/1998 | Hasnik | 70/237 |
| 5,810,418 A | 9/1998 | Stenger et al. | 296/72 |
| 5,823,612 A | 10/1998 | Angelo | 296/37.12 |
| 5,873,749 A | 2/1999 | Takiguchi et al. | 439/534 |
| 5,938,266 A | 8/1999 | Dauvergne et al. | 296/70 |
| 5,951,087 A | 9/1999 | Bittinger et al. | 296/72 |
| 5,971,461 A | 10/1999 | Valshnav | 296/37.12 |
| 6,048,020 A | 4/2000 | Gronowicz et al. | 296/70 |
| 6,062,626 A | 5/2000 | Bayer et al. | 296/72 |
| 6,129,406 A | 10/2000 | Dauvergne | 296/70 |
| 6,170,304 B1 | 1/2001 | Ohta | 70/14 |
| 6,176,534 B1 | 1/2001 | Duncan | 296/37.12 |
| 6,234,569 B1 | 5/2001 | Derleth et al. | 296/208 |
| 6,276,739 B1 | 8/2001 | Wich | 296/72 |
| 6,283,417 B1 | 9/2001 | Ikunami | 248/27.3 |
| 6,315,347 B1 | 11/2001 | Gotz | 296/72 |
| 6,709,041 B1 | 3/2004 | Hotary et al. | 296/70 |
| 7,040,686 B2 * | 5/2006 | Kapteyn | 296/70 |

* cited by examiner

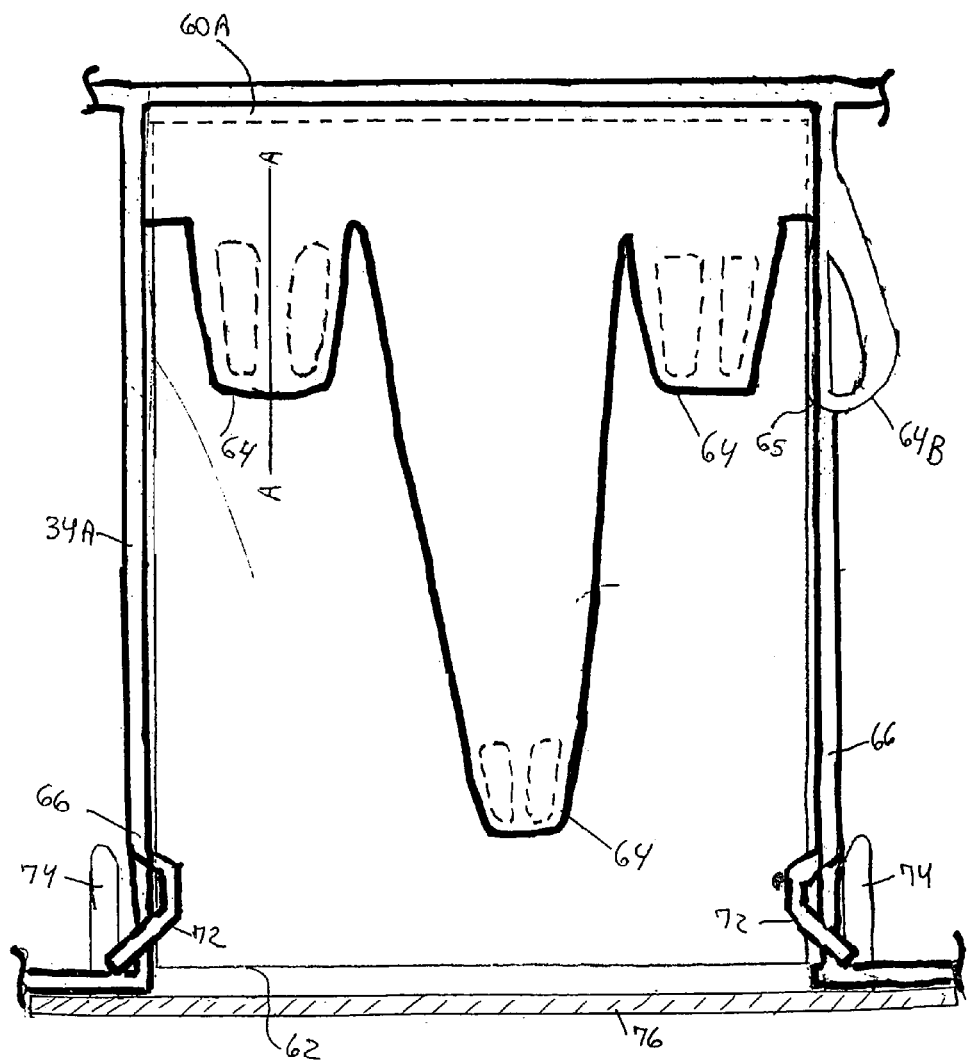

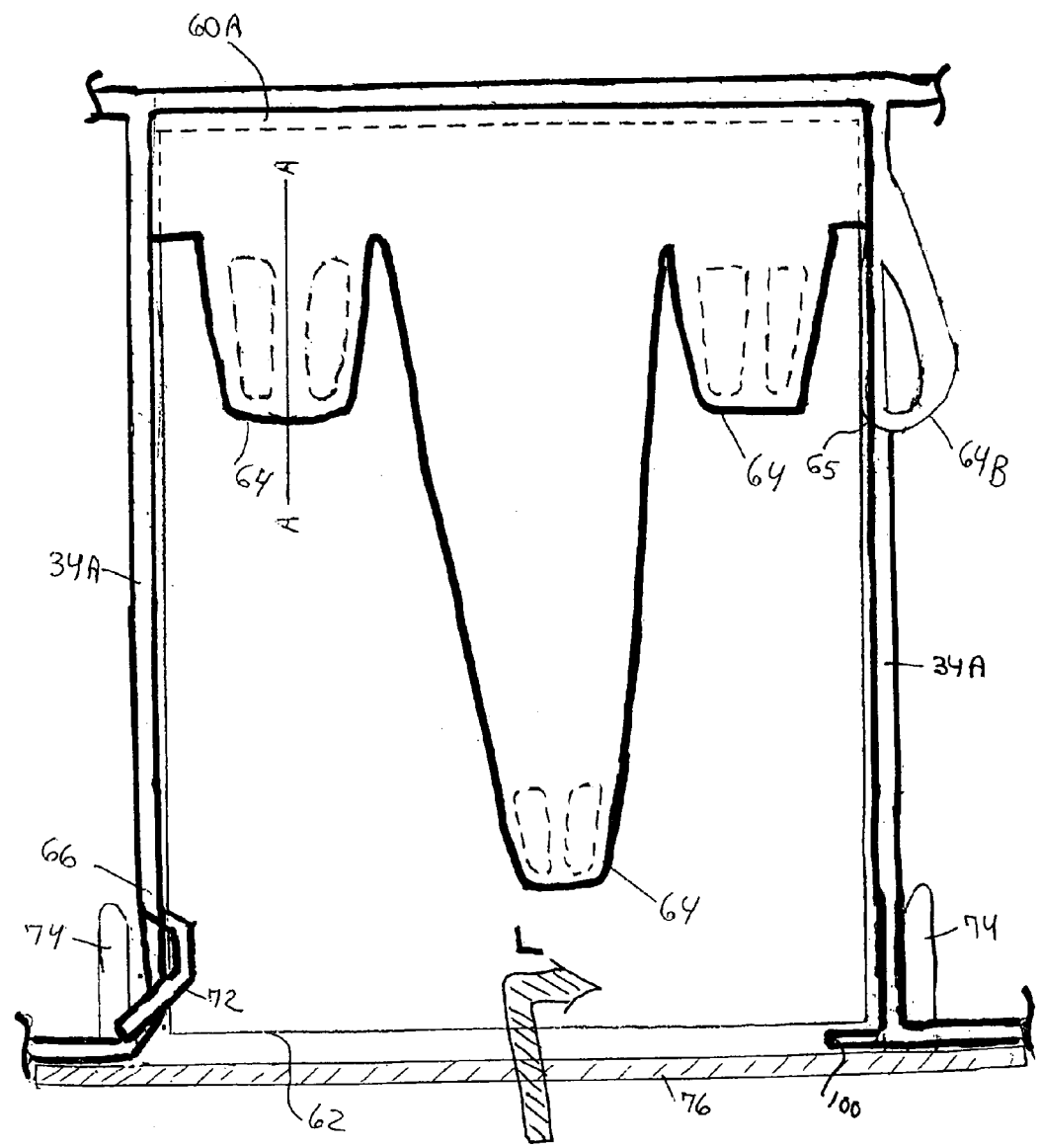

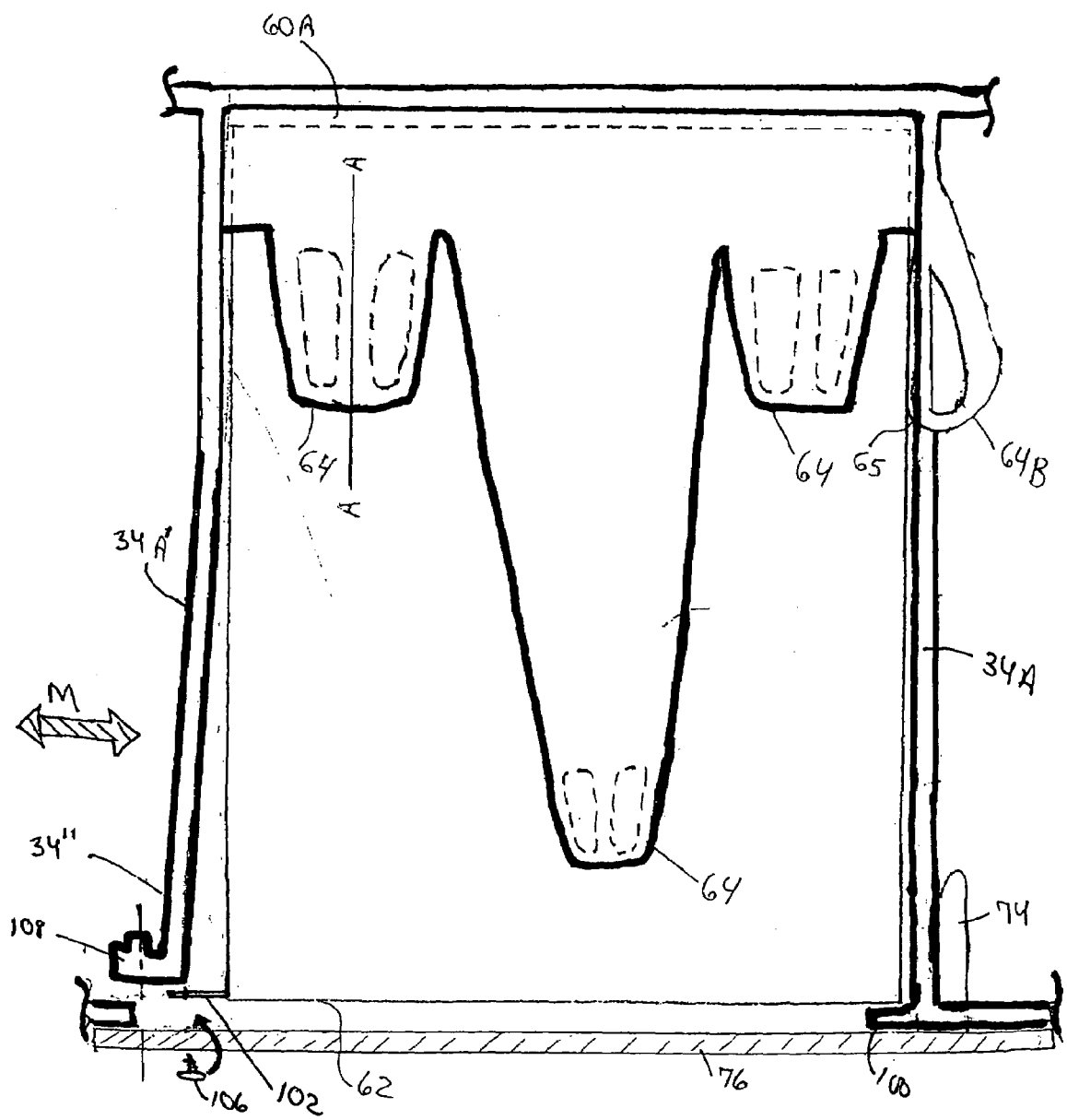

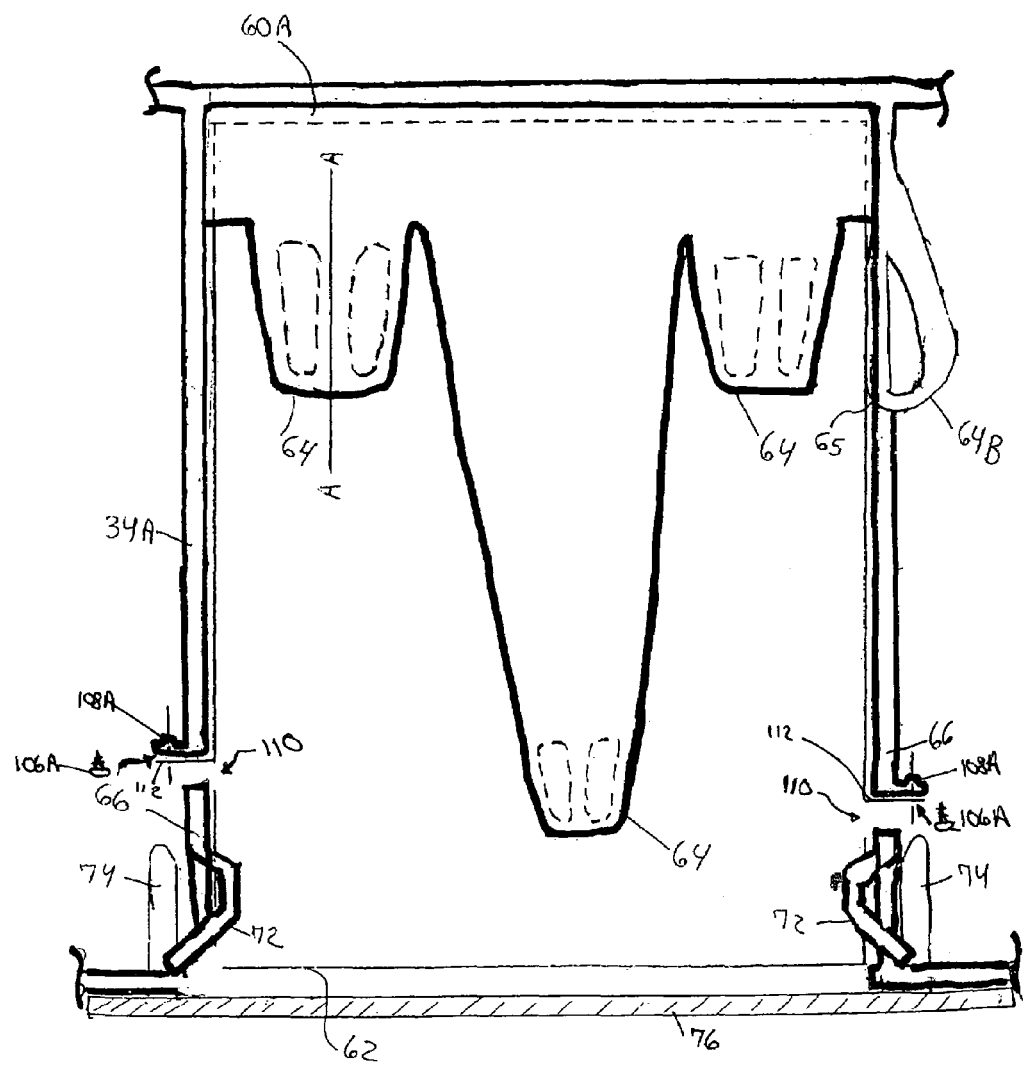

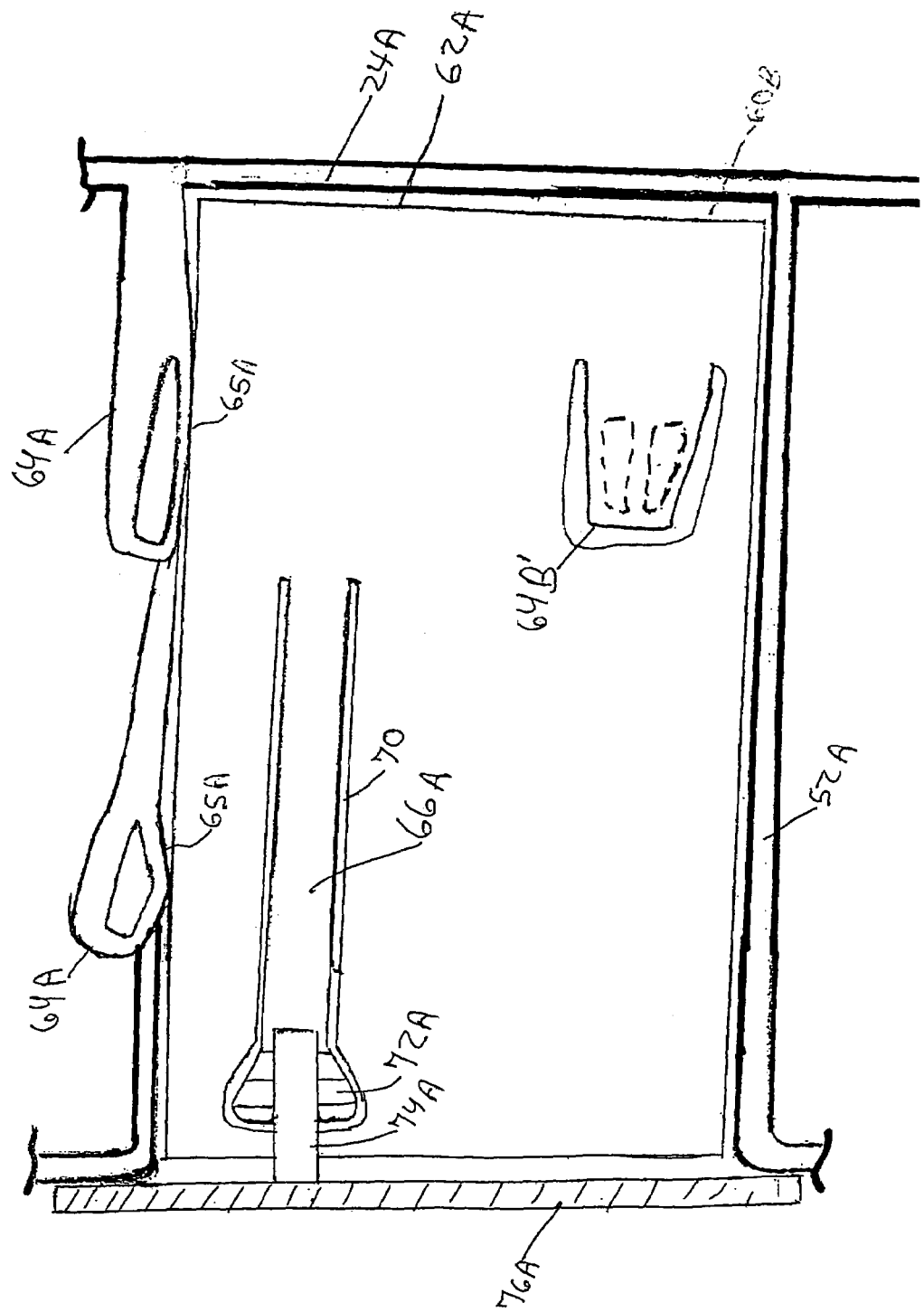

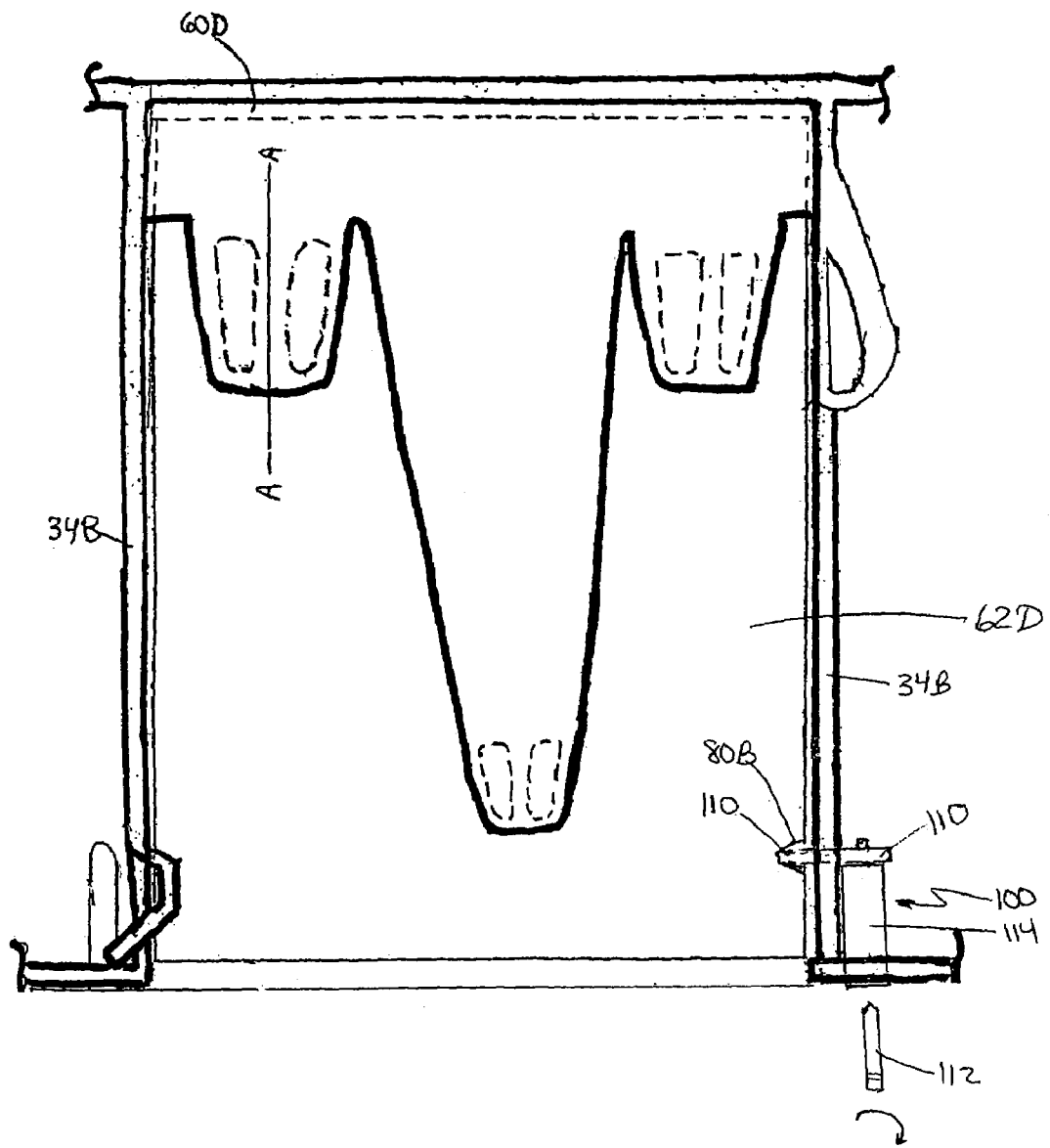

INTEGRATED CENTER STACK ELECTRONIC MODULE RETENTION SYSTEM

CROSS REFERENCE TO RELATED APPLICATIONS

This application is a continuation-in-part of U.S. application Ser. No. 10/610,430, filed Jun. 30, 2003, now U.S. Pat. No. 7,040,686, entitled "Integrated Center Stack Electronic Module Retention System", the disclosure of which is incorporated herein by reference in its entirety as if set forth fully herein, which application claims the benefit of U.S. Provisional Application 60/392,085, filed Jun. 28, 2002.

FIELD OF INVENTION

This invention generally relates to a more robust design for an automotive center stack structure that serves to align and contain electronic modules within mounting openings. More particularly, the present invention relies on pinch-off features molded into the center stack structure of a transportation vehicle to control vertical and horizontal location of the module. The pinch-off features may be combined with extended snap-tabs interlockedly engaged with extended trim panel pins to control fore-aft location and to secure the module in the opening. In addition, the present invention relates to a locking device and engagement mechanism to releaseably secure electronic modules within mounting openings.

BACKGROUND OF THE INVENTION

Instrument panels or dashboards for modern vehicles (cars, trucks, buses, airplanes, boats, etc.) are generally comprised of a series of modules integrated together to form a rather complex cockpit assembly which may be installed as a single unit into a forward portion of the vehicle occupant space. The instrument panel reinforcement structure serves as a skeleton or support base for various major components to be mounted upon, such as a steering column assembly, pedal assembly, glove box, passenger side air bag assembly, instrument cluster, entertainment/information system, heating/ventilation/air conditioning unit, radio, tape deck, CD player, clock, and telematics devices such as GPS. The "center stack" area of the vehicle instrument panel generally is where many of these components are "stacked" so that their controls are within easy reach of the driver. The center stack area may comprise a number of these components in vertical alignment in the center of the instrument panel or may comprise a center console, a separate molded structure that contains the components and extends back between the front seats of the vehicle to provide additional storage capacity as well as an area for the shifting lever.

It should be noted that all references made herein to directions such as left, right, front, rear, forward and rearward are relative to the vehicle as a whole. That is, the "front" surface of the instrument panel is toward the front end of the vehicle, and the "rear" surface is that which is directly in front of an occupant of the vehicle when the instrument panel is installed in the vehicle.

Common concerns when installing components and modules into an instrument panel in order to project a high quality of workmanship to the consumer include squeaks and rattles, gaps—especially of non-parallel lines, and electrical connectivity. For these reasons, alignment and retention of components and modules is an important criteria in the design, testing and evaluation of instrument panels. In addition, since some of the components are relatively heavy, retention during and after a vehicle impact must also be considered. Further, theft of these expensive components and modules may be of concern and there may be a need for a locking mechanism that allows easy removal but prevents theft.

Currently, most components and modules are retained by fasteners such as screws, clips, etc. These devices do not allow for easy removal of the component for service and do little to ensure alignment of the component in all three planes (up-down, left-right, and fore-aft).

U.S. Pat. Nos. 5,873,749 and 6,048,020 both to Yazaki Corp., disclose electrical interconnection modules and means for mounting these into openings in an instrument panel and are directed at making a solid electrical connection.

U.S. Pat. No. 5,560,572 issued to General Motors Corporation discloses a mounting assembly comprising a device, such as a radio, with opposing vertical sides, and an instrument panel including a recess having a rearward access opening and opposing spaced-apart sidewalls. Each sidewall has a dovetail rail which cooperates with tapered dovetail slide members which are fixedly mounted to the opposing sides of the device. These secure the device in the instrument panel, yet allow relatively easy removal.

U.S. Pat. No. 4,993,668 to Fujitsu Ten Limited discloses a mounting structure for a device such as a radio, which comprises a mounting tube fixed in the mounting hole of the panel. Elastic pieces having detent pawls formed at the end parts are inserted into detent holes and dislocated angularly to retain the device. Similarly, U.S. Pat. Nos. 6,283,417B1; 5,676,338; 5,366,186; 4,867,398 and 4,053,130 disclose means for locating devices in instrument panel openings but rely on additional components (rails, brackets, clips, etc.) to engage the device with the walls of the opening.

Each of the major components and modules assembled into the center stack of the vehicle has its own dimensional tolerances which are built into the design, materials and processes used to manufacture and assemble the component or module. Since plastic parts shrink in size upon molding and cooling, this size reduction must be factored into the design of the component to ensure a tight fit. Likewise, metal assemblies, such as a radio chassis, are composed of a series of smaller sub-components fitted together, and bring along a stacking of tolerances from each of the individual components. Matching the shrinkage of plastic parts and the stack-up of tolerances on metal assemblies to provide a predictable fit having no gaps or rattles and reliable electrical connectivity is an ongoing problem in the automotive industry.

What is needed is an instrument panel retainer incorporating molded features in the center stack area which can align and positively locate slidably engaged electronic modules and the like, in a manner which compensates for tolerance stack-up between mating components, while yielding a pleasing appearance to the vehicle occupants, minimizing aggravating rattles during use and providing more reliable electronic connectivity and which allows removal of the modules, yet protects against theft while accomplishing the above.

SUMMARY OF THE INVENTION

It is the object of the present invention to overcome the limitations of known instrument panel and console structures by providing an overall design of molded features located, angled and integrated in such a manner as to error-proof the assembly of the modules and components into the retaining structure. The molded features fixedly retain said components without the need for additional fasteners such as screws, bolts, clips, etc, yet allow removal for servicing.

According to the invention, the first object is achieved by molding tapered "pinch-off" features strategically located on the instrument panel structure in the center stack mounting opening to guide the slidable engagement of the modules or components in both left-right (x) and up-down (y) planes.

It is a further object to include retention features in the instrument panel structure and matching features in the exterior of the component or module to provide a hard stop such as a ridge or shoulder that can firmly retain the component in the fore-aft (z) plane, yet allow the component to be removed easily, by not requiring the use of fasteners.

It is still further object of the invention to provide pins which project from the back of the decorative trim panel toward the module, and removably engage with the snap tabs to prevent accidental dislodging of the module, eliminating the need for traditional fasteners.

It is still further object of this invention to bias all of these features towards a single forward corner of the mounting opening to provide a highly repeatable connector alignment and highly reliable electrical connectivity.

It is a further object to provide snap-tab features on the sides of the mounting opening which may positively engage into a matching depression or hole in the module or component outer wall to ensure component location and retention.

It is a further object of the invention to provide a locking device and engagement mechanism consistent with the other objects of this invention that allows easy removal of the module, yet prevents theft.

BRIEF DESCRIPTION OF THE DRAWINGS

These and other objects, features and advantages of the invention will become apparent upon consideration of the description of the invention and the appended drawings in which:

FIG. 3 is a top view of the center stack area of FIG. 2 embodying the present invention.

FIG. 3A is a top view of an alternative design of the center stack area of FIG. 2 embodying the present invention FIG. 3B is a top view of an alternative design of the center stack area of FIG. 2 embodying the present invention FIG. 3C is a top view of an alternative design of the center stack area of FIG. 2 embodying the present invention FIG. 4 is a side view of the center stack area of FIG. 2 embodying the present invention.

FIG. 10 is a top view of an alternative design of the center stack area shown in FIG. 3, including the locking system of FIG. 9A.

DESCRIPTION OF THE INVENTION

Figure 1:
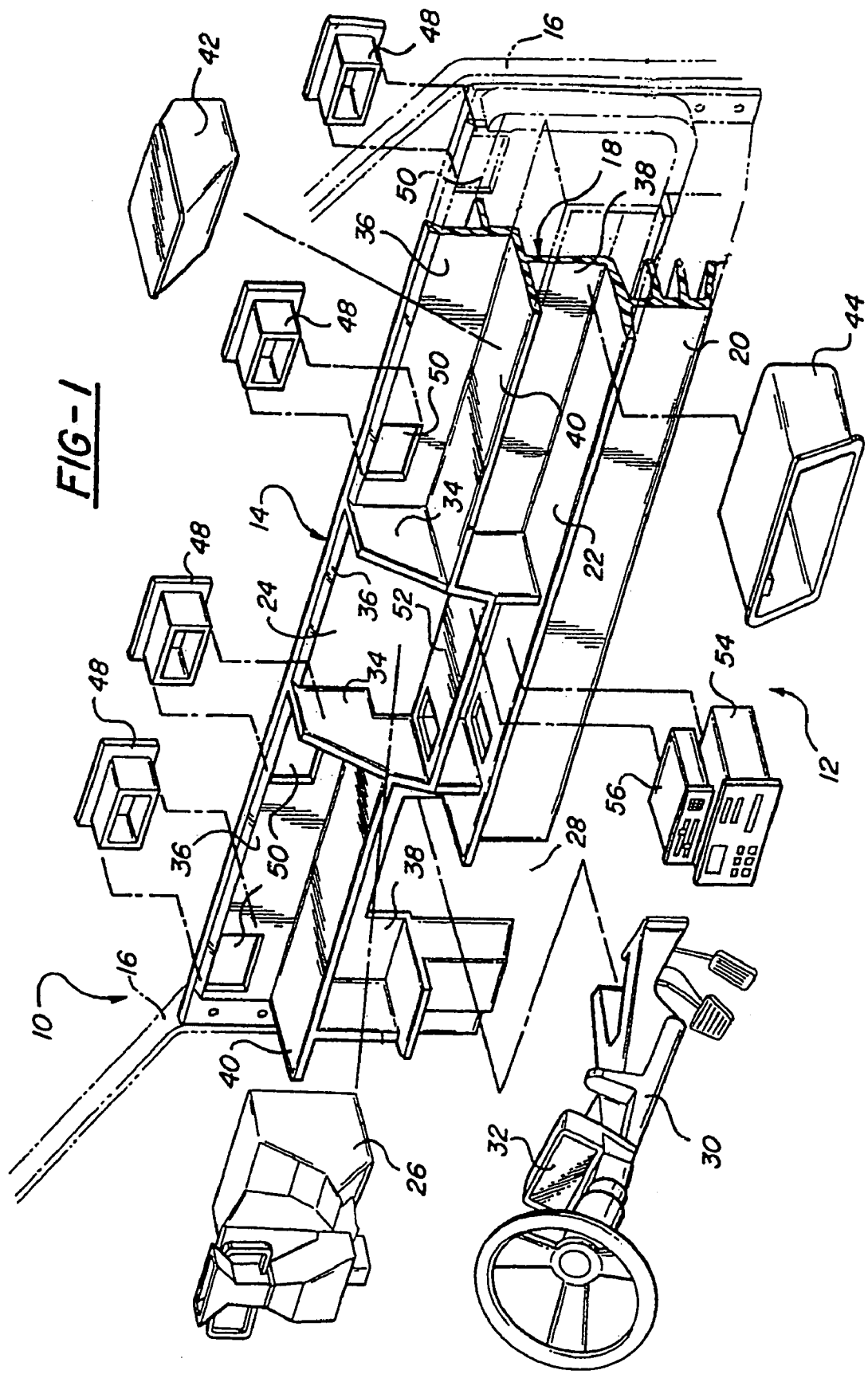
FIG. 1 is a perspective view of a vehicle instrument panel with a center stack area.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B, and so forth in subsequent embodiments. Thus, where an embodiment description uses a reference character to refer to an element, the reference character applies equally, as distinguished by alphanumeric character, to the other embodiments where the element is common.

Instrument panel assemblies in current motor vehicles are generally a series of modules assembled to a complex molded plastic or composite substructure. The substructure often is reinforced with metal brackets, cross-car beams or composite moldings containing reinforcing materials. The surface of the substructure may be integrally formed of thermoplastic to form a hard panel or covered with a soft thin skin of vinyl, urethane or olefin backed with a soft foam layer to yield a plush feeling surface.

The molded plastic substructure is generally injection molded due to its complex and varied shape which may include undercuts, die locks, ribs, bosses and attachment features. In some instances, other processes such as blow molding, compression molding structural RIM (glass reinforced) urethane and insert molding of reinforcing beams and brackets have been used. See, e.g., U.S. Pat. Nos. 5,364,159 and 5,556,153 commonly assigned to the assignee of the present invention and included herein by reference.

Often, due to the multitude of requirements placed on these structures, for instance, to provide controlled crush resistance, to sustain high heat loads without deflection, to provide structural support for the steering column, pedal and air bag assemblies, all styled into a smooth pleasing aesthetic appearance, the structure may comprise major modules fastened together. Generally, these may comprise a cross-car beam and instrument panel retainer, cross-car ducting for the HVAC system and a separate center stack assembly housing. Since there are numerous smaller components and modules subsequently attached to the cross-car structure, it is often impossible to mold all the features, angles, die locks etc. in a single injection mold.

The instrument panel substructure or retainer, whether it comprises an integrated or separate center stack, requires the use of a relatively rigid thermoplastic to meet the aforementioned requirements. Materials such as polycarbonate/acrylonitrile-butadiene-styrene (PC/ABS) blends, polyphenylene oxide, styrene maleic anhydride (SMA), and polypropylene (PP) whether unfilled or filled with talc or glass fibers may fulfill the requirements.

In this invention, preferably either a separate center stack assembly may be attached to a main retainer, or the center stack assembly may be integrally formed as a part of the instrument panel retainer or substructure, to form the mounting openings for components, such as but not limited to, a glove box, radio, CD player, HVAC control module or telematics devices.

Referring now to the drawings, FIG. 1 shows a motor vehicle body 10 that has an instrument panel construction 12 that includes a structural instrument panel carrier or substructure 14 in accordance with the invention. The structural instrument panel carrier 14 allows for mounting instrument panel components in the motor vehicle body 10 between the side stanchions or A-pillars 16. These A-pillars are located at a juncture of passenger and engine compartments and typically carry hinges for supporting swinging front vehicle doors.

The A-pillars 16 are typically connected by a cross beam at the cowl, and in this case, the structural instrument panel carrier 14 is connected to the A-pillars 16 at each end to reinforce the vehicle body and increase its torsional rigidity. The structural instrument panel carrier 14 is molded as one piece of strong thermoplastic material, preferably a fiber-filled thermoplastic material or blend such as PC/ABS, SMA or PP.

The upper back panel 18 has a central opening 24 for a heating, ventilating, air conditioning ("HVAC") module 26 that includes a fan and inlet and outlet ducts for connection to an air distribution system. The lower back panel 20 has an opening 28 for a steering column assembly 30 that may carry an instrument package 32. The steering column opening 28, which is on the driver's side of the vehicle, is laterally spaced from the central opening 24 of the upper panel 18.

The shelf panel 22 and the lower back panel 20 each have a portion on the passenger side of the vehicle that extends far enough to span the central opening 24 in the upper back panel 18 and preferably extends all the way to the steering column opening 28.

The structural carrier 14 also has two laterally spaced vertical walls 34 at the sides of the central opening 24 in the upper back panel 18 that are integrally connected to respective edges from the upper back panel 18 defining the center stack area 24. The vertical walls 34 project rearwardly from the upper back panel 18 with their bottom edges being integrally connected to the shelf panel 22 that spans the central opening 24. The laterally spaced vertical walls 34 provide a compartment for a portion of the HVAC module 26 and increase the torsional rigidity and bending strength of the one-piece structural carrier 14.

The upper back panel 18 comprises an upper section 36 and a lower section 38 that are interconnected by a rib 40 that projects rearwardly of the sections 36 and 38 to support instrument panel components that face the passenger compartment, such as air bag module 42 and to support other instrument panel components, such as glove box 44 in cooperation with the shelf panel 22. The rib 40 has portions on either side of the central opening 28 that are integrally connected to the vertical walls 34 respectively.

In the center stack area, the structural instrument panel carrier 14 further comprises a short shelf 52 that is connected to the vertical walls 34 and the shelf panel 22 to provide a compartment for an instrument panel component, such as radio 54. The shelf 52 itself also provides support for an instrument panel component such as an HVAC control module 56.

Also shown are air duct nozzles 48 that may snap-fit into a plurality of air passage openings 50 to distribute air to the passenger compartment of the vehicle.

Figure 2:
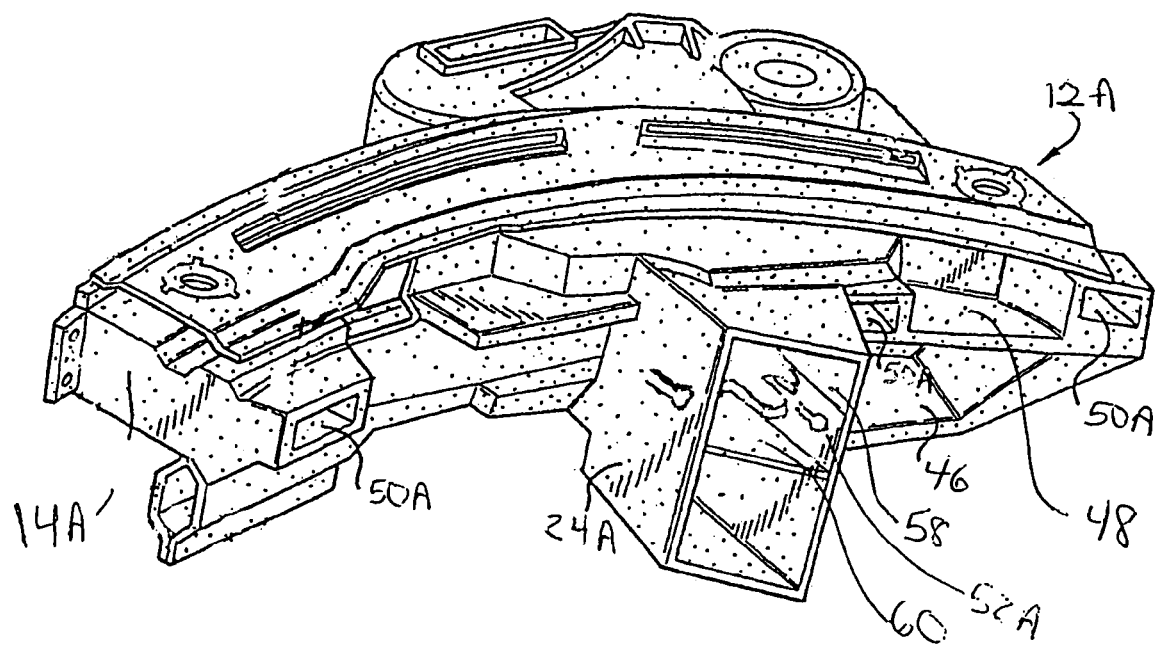
FIG. 2 is an alternate construction for a vehicle instrument panel with a center stack.

An alternate construction of an instrument panel carrier or substructure is shown in FIG. 2 having reference numerals corresponding to FIG. 1. In this example the center stack 24A has been formed separately and attached to the carrier structure 14A. Molding the center stack area separately allows for a less complex design for the injection molding tool which forms the carrier 14A, reducing not only design complexity, but tool cost and molding cycle time.

Also shown in FIG. 2 are the mounting openings 50A for the air duct nozzle (not shown) as well as mounting openings 46, 48, 58 and 60 for the glove box module, air bag module, HVAC control and radio module, respectively.

Focusing now on the center stack area, the details of the invention will be described. In one preferred exemplary embodiment, a radio module or chassis will be used to describe how an overall desired component fit may be achieved. The same features as herein described may be applied to any of the aforementioned components, modules or assemblies which may be installed into the instrument panel area or other interior trim component. The objective is to obtain a balance between an error-proof, overall fit of the component into the mounting opening, and ease of installation.

Figure 8:
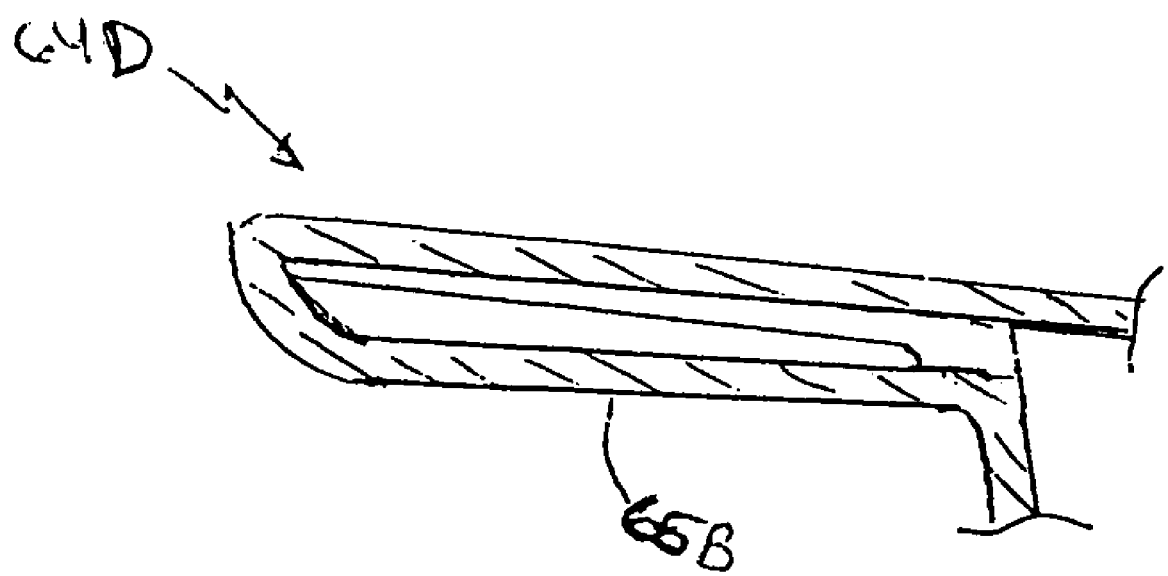
FIG. 8 is a sectional view taken through line A-A of FIG. 3.

FIG. 3 is a top view of the center stack 24A of FIG. 2. A radio module 62 is shown installed in the mounting opening 60A in FIG. 3. Features which are molded into the respective walls of the center stack area 24A include a plurality of tongue-like projections 64 or pinch-offs that extend rearward in car from the upper shelf 52, 52A as shown in FIGS. 1 and 2 respectively, to locate the radio module in the up-down (y) direction. As shown in FIG. 4 (and FIG. 8 in sectional view) these are hollowed out shapes that are angled or drafted on their lower surface 65 so that as a radio module may be slidably engaged into a mounting opening. The dimensional fit becomes tighter as the radio module is pushed further forward into the opening. The tongue-like hollowed-out projections thus can be deformed slightly by the force of the radio module being inserted into the mounting opening to ensure a snug fit in the up-down plane.

Turning again to a top view of the center stack area (FIG. 3), a similar tongue-like projection or molded pinch-off 64B is shown at the forward right side corner of the mounting opening 60A for the radio module 62. This feature forces the radio module when slidably engaged, towards the left side wall 34A (34 in FIG. 1) of the center stack 24A and in combination with the features 64A in the top wall of the mounting opening, bias the radio module towards the lower left hand corner of the mounting opening 60A where the electrical connectors for the radio are located. This substantially reduces the variation due to tolerance stack-up that the pins and matching electrical connectors will encounter.

FIG. 4 is a side view of the mounting opening 60B with the tongue-like projection firmly engaging the top of the radio module 62A and the right side projection 64B' forcing the module towards the left side of the mounting opening 60B.

Figure 5:
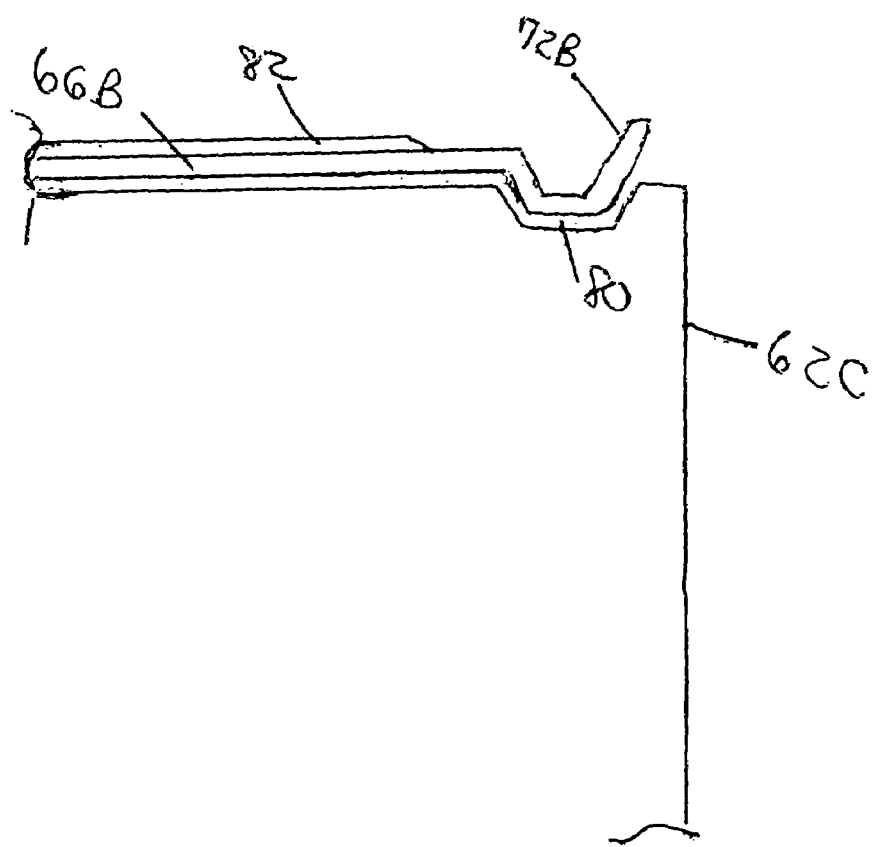
FIG. 5 is a partial view of one embodiment of the center stack area of FIG. 2 embodying the present invention.
Figure 6:
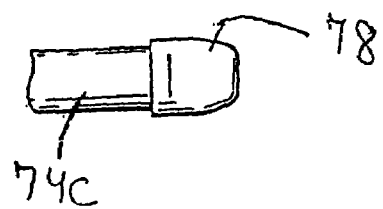
FIG. 6 is an alternative embodiment of a feature of FIG. 3.

Turning again to FIG. 3, the retention features of this invention will now be described. Snap-tabs 66 molded as part of the side wall 34A of the mounting opening engage with matching depressions in the side of the radio module 62. In some instances, the depressions may be in the form of a hole or slot. As shown in the side view in FIG. 4 these snap tabs are long fingers extending rearward in car separated from the side wall 34A by a molded-in gap 70 such they are cantilevered. The end feature 72 of the snap tab 66 is forked to receive a pin 74 (see FIGS. 3 & 7) extending from the close-out face plate 76 that covers the face of the radio module 62. When the face plate is snapped into place around the radio, the pins 74 engage between the forks of the snap tab end feature 72 to force the snap tab end feature 72 into hard contact with the mating depression 80 in the side radio module 62. This is shown in FIG. 5 in a separated condition where the snap tab 66B has not yet firmly engaged the radio module 62C in the depression 80 in the side wall. Once the face plate 76A is installed, the pin 74A will force the snap tab feature 72B into the depression 80. This construction eliminates the need for fasteners to hold the face plate in place on the radio. Additionally, as shown in FIG. 5, an alternate construction for the snap tab 66B is shown to increase the stiffness and retention capability of the end feature 72B. This alternate construction includes a rib 82 molded onto the outside surface of the snap tab. Retention features such as shoulders 78 or rings may be included as part of the pin extending forward in car from the face plate to engage with the forked feature 72B of the snap tab and prevent accidental removal of the face plate 76A. FIG. 6 shows this alternate construction for the end of the pin 74C. In the instance where a particularly heavy component or module is used, it may be necessary to insert-mold sections of metal into areas of the center stack plastic substructure to provide dimensional stability and ensure retention of the component in the case of a vehicle impact.

In another embodiment, the end feature 72A off the snap tab 66A can have a slot or hole molded in for location to the pin 74A. Alternatively, since fasteners are not required of the face plate in this design, it may be integrated into a larger face plate for additional modules installed in the center stack area reducing part count. An additional alternative design in the instance where no trim panel is required to close out the occupant facing surface of the component, involves the pin 74a extending forward in car from a peripheral flange on the component 62c to interface with the forked feature 72b of the snap tab 66b.

Other design alternatives for more secure retention of heavy components, if needed, and for addressing reinstallation of the component after servicing are shown in FIGS. 3A-3C. In FIG. 3A, a "snap and trap" design is employed to provide an additional retention feature in the center stack molding. Rather than using a snap tab 66 in the right side mounting wall 34A of the mounting opening 60A, (as shown in FIG. 3), a solid wall is molded with one or more short tabs or bosses 100 extending locally laterally for a short distance from the peripheral edge at the rear of the mounting opening 60A. The component 62 is then installed by sliding it forward (in car) into the mounting opening 60A and past the tab 100. Once the rearward right corner of the component 62 is past the tab 100, the component 62 may be shifted to the right and trapped behind the tab 100 to further insure the solid location of the component in the mounting opening. Arrow L describes this process.

Turning to FIG. 3B, a variation of the design features of FIG. 3A is shown. Here, the right side wall 34A of the mounting opening 60A is as shown in FIG. 3A, including the tab 100 for "trapping" the component, and a portion of the left side wall 34A' of the mounting opening 60A includes a spring leg 34". The spring leg 34" is preferably thicker than the normal wall section 34A' and is designed to flex outward in the direction of arrow M to allow the component 62 to be inserted into the mounting opening 60A. The component 62 has one or more local tabs or flanges 102 that extend outward laterally from the rear (in-car) edge of the component 62. After the component 62 is securely installed in the opening 60A, the spring leg 34", will spring back from its deflected position during installation and a screw 106 may be installed through a hole in the component tab or flange 102 and into a boss 108 in the end of the spring leg 34".

FIG. 3C addresses the instance where a component may be removed for servicing and on re-installation, a condition exists where additional retention is required (for instance, a portion of a snap tab 66 may have broken off in disassembly). This design alternative also provides an option to include a minimum number of fasteners to hold a heavy component in place in the event of a vehicle impact. Here, the sidewalls 34A of the mounting opening 60A include molded-in bosses 108A which are located just forward of small openings 110 in the side wall 34A. In the component 62 to be installed, there are u-shaped slots which outline tabs or flanges 112 which approximate the shape of the opening 110 and are located to be closely aligned in fore-aft and up-down planes with the openings 110. Upon installation of the component 62 into the mounting opening, the tabs 112, which lie in the same plane as the side wall of the component 62, may be accessed through the opening and bent outward to meet the rearward surface of the bosses 108A. The tabs 112 contain a hole through which a screw 106A may be inserted to secure the component tab 112 to the boss 108A. The bosses, tabs and holes are located sufficiently rearward in car to be easily accessible from the interior of the vehicle.

Figure 7:
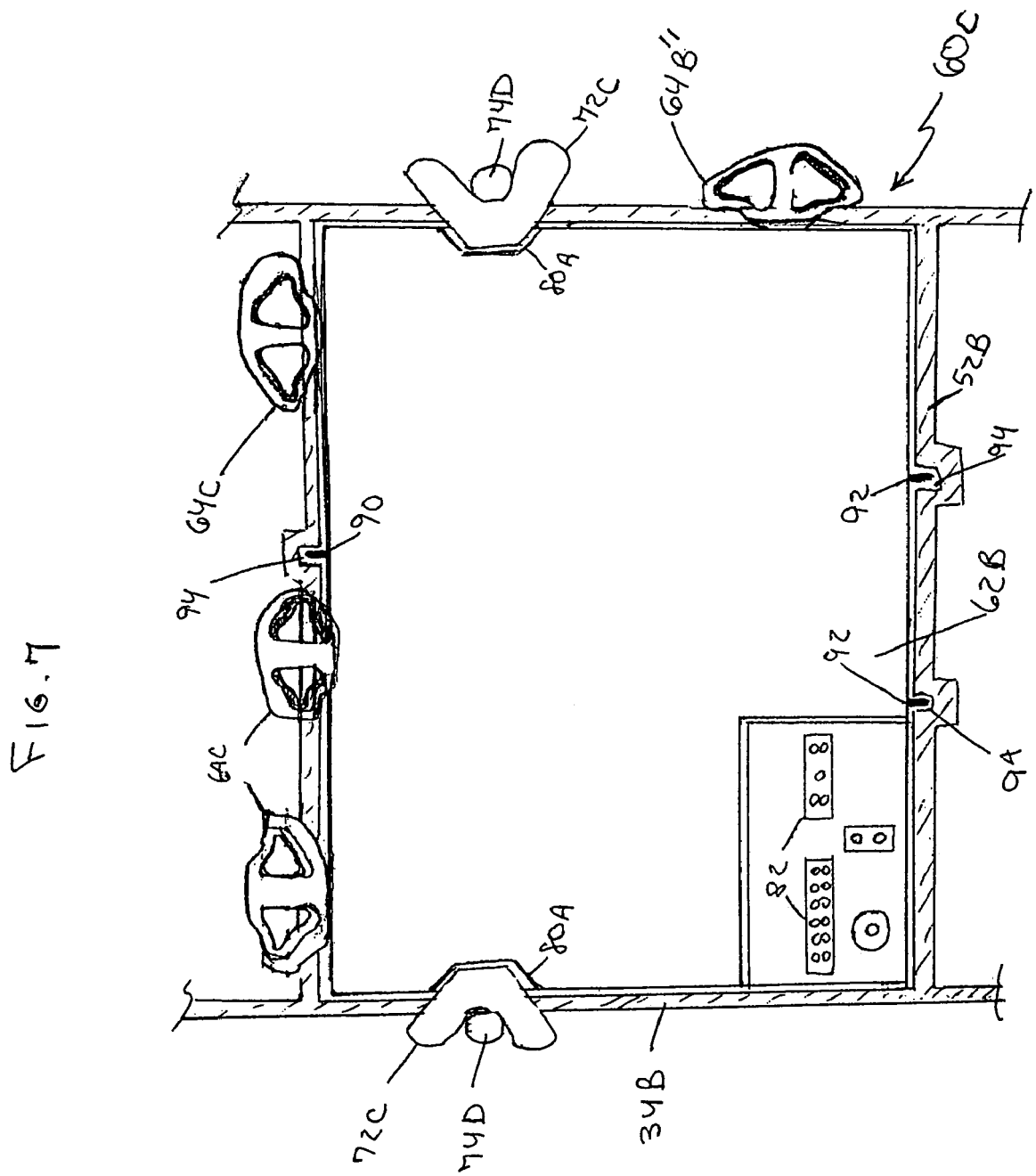
FIG. 7 is a front view of the center stack area of FIG. 2 embodying the present invention.

FIG. 7 shows an embodiment with additional features for error proofing the installation of the radio module 62B. This is a front view of the mounting opening 60B of the center stack 24A (see FIG. 2) showing the molded tongue-like projections or pinch-off features 64C locating the top of radio module and the right hand projection 64B" locating the right side of the radio module, biasing the installation towards the lower left hand corner of the mounting opening 60C where the electrical pins and corresponding connectors 82 have been placed. Additional features shown are the snap tab end features 72C engaged with the sides of the radio module 62B at 80A. Further, three fins 90, 92 have been built into the top and bottom of the radio module 62B which slidably engage with slots 94 in the top and bottom walls of the mounting opening 60C to error-proof the installation from any possibility of installing the module upside down. The fins are asymmetrically placed on the opposing walls such that incorrect installation of the module is prevented. These pins and slots do not have to be snug or locating fits as the aforementioned features of the present invention accomplish that purpose. Rather they are preferably designed to prevent incorrect installation.

Additionally, any of the four walls of the mounting opening 60 can be tapered or drafted slightly, first to ease removal of the molded part from the injection molding tool, but also to guide the slidable engagement of the module towards an acceptable and secure registration in the mounting opening.

Figure 9:
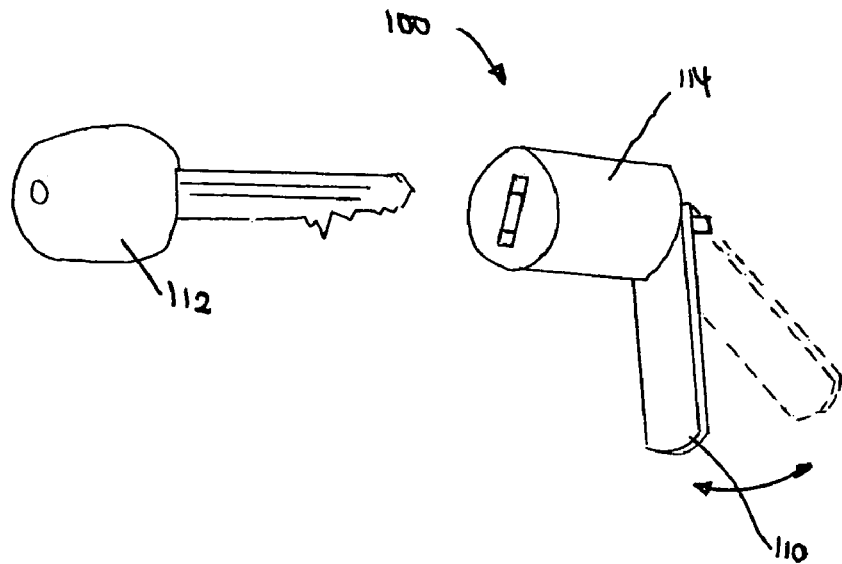
FIGS. 9 and 9A are perspective views of locking systems embodying the present invention.
Figure 9A:
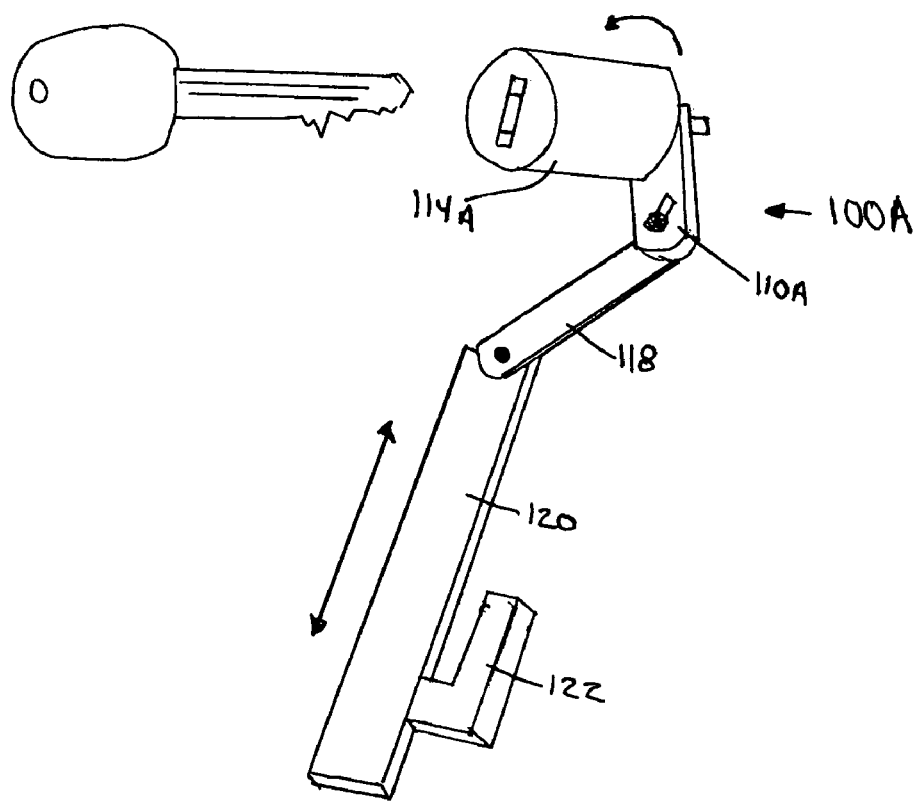

A locking device and engagement mechanism to secure electronic components and modules into a mounting opening is shown in FIGS. 9 and 9A.

Due to the high value of electronic components and modules such as would be installed in a center stack, console or rear deck area of a vehicle, it is important to provide a means for releaseably locking the modules or components into the mounting opening, preventing theft.

The locking system of the present invention securely retains the component or module in the mounting opening of the dash or console of the vehicle and protects against theft by using a lock cylinder assembly that preferably uses the ignition key for the vehicle. Thus on exiting the vehicle, the occupant may remove the component or module and use that component at home or in the office (a CD or DVD player or satellite radio, for instance), or may use the key to lock the component securely in the mounting frame, thereby preventing or at least deterring theft. Likewise, rack-mounted modular electronics may be secured in the home or in an office in a similar manner.

As shown in FIG. 9, the locking system may include a lock cylinder assembly 100 including a sliding or rotating locking bar 110 which upon turning of a key 112 in the lock cylinder 114 causes the locking bar 110 to interfere with removal of the module by moving from a first unengaged position (in phantom) to a second engaged position.

FIG. 10 shows the lock cylinder assembly 100 mounted into the side wall 34B of a mounting opening 60D and the locking bar 110 engaged with a matching depression in the side of a component; such as a radio module, 62D. In some instances, the depression 80B may be in the form of a hole or slot. Upon turning of the key 112 in the lock cylinder 114, the locking bar 110 may be rotated or alternately slid or otherwise moved from an unengaged position to a position as shown where the locking bar 110 is engaged with the depression 80B and prevents removal of the module 62D.

As shown in FIG. 9A, an alternate lock system 100A comprises a lock cylinder 114A attached to a preferably rotating bar 110A. The rotating bar 110A is connected to a slider 120 through by a linkage bar 118 which has a first end pivotally engaged with the rotating member 110A and a second end engaged with the slider 120. The slider 120 preferably may include a hook feature 122 which is guided by the action of the slider into and out of engagement with a depression or slot in a module for retention.

Thus, depending on the location of the lock cylinder assembly at or near the outer frame of a mounting opening and the amount and location of space around the periphery of the opening, engagement of a member by lateral (sliding) movement or rotary movement is possible.

Preferably, the end of the lock cylinder that receives the key aligns with an opening in the face plate of the module for ease of access.

While the lock cylinder assembly of the present invention is preferably made of metal, to prevent buzz, squeak and rattle, the locking bar 110, 110A may be coated with a rubber or plastic composition. Alternatively, the slider 120, locking bar 110, 110A and linkage bar 118 may comprise a relatively rigid or stiff engineering plastic, preferably glass filled to reduce the potential for noise.

Further, the lock cylinder assembly of the present invention may comprise an elongated slider (similar to that shown in FIG. 9A) including multiple hooks which may act, for instance, vertically in the center stack area of a vehicle to engage and retain multiple modules aligned one above the other.

While shown here as an exemplary application in an automotive vehicle, the locking mechanism of the present invention may also be used to secure and retain modules in other transportation vehicles, such as planes, trains, boats, etc. as well as in homes (for stereos DVD's, CD players, etc.) and in businesses such as offices, internet cafes, libraries (for computers and cameras in docking stations and the like).

Thus, it can be seen that the invention provides a new and novel combination of molded features included in the center stack area of a motor vehicle instrument panel or console to reliably locate modules and components in an overall fashion to compensate for tolerance stack-up. Additionally, the invention also provides for a reduction in the number of or elimination of fasteners required while reducing the likelihood of squeaks, rattles and unsightly gaps in the viewing surface of the instrument panel. Further, the invention provides for a locking system to prevent theft of such components.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically shown and described.

I claim:

1. A vehicle instrument panel assembly comprising:
   a structural carrier including a center stack for housing at least one component wherein said center stack includes at least one mounting opening having opposing walls for slidably engaging said at least one component into fixed relationship with said at least one mounting opening, wherein said at least one component includes one or more depressions,
   wherein at least one molded feature in the walls of said at least one mounting opening engages said at least one component to align and fixedly retain said at least one component in the mounting opening, said at least one molded feature comprising two elongated cantilevered snap-tabs, one of which engages with a pin extended from a back surface of a finish trim plate of said at least one component to force said snap-tab into said depressions, and
   including a lock cylinder assembly for retention of said at least one component in said mounting opening, wherein the lock cylinder assembly comprises a lock cylinder connected to a locking bar wherein upon insertion of a key into the lock cylinder and rotation of the key in the cylinder causes the locking bar to move from a first unengaged position to a second position wherein the locking bar engages one of said one or more depressions.

2. The vehicle instrument panel assembly of claim 1, wherein said center stack molded feature comprises at least one fore-aft tongue-like molded projection in the walls of said center stack to align and fixedly retain said at least one component within said mounting opening.

3. The vehicle instrument panel assembly of claim 1, wherein said depression is a hole or slot.

4. The vehicle instrument panel assembly of claim 1, wherein the lock cylinder assembly comprises a lock cylinder connected to a bar which is pivotally connected to a slider by a linkage bar, wherein upon insertion of a key into said lock cylinder and rotation of the key in the cylinder causes the slider to move from a first unengaged position to a second position wherein said slider engages said at least one component in said mounting opening.

5. The vehicle instrument panel assembly of claim 4, wherein said at least one component includes a depression which is engaged by said slider upon moving to said second position.

6. The vehicle instrument panel assembly of claim 1 wherein said at least one component comprises one or more of a radio module, an HVAC control module, a compact disc player, a cassette tape deck, a telematic device, a portable computer, and a DVD player.

7. A vehicle interior trim panel comprising a mounting opening with opposing walls for slidably engaging a component into fixed relationship with said mounting opening wherein said at least one component includes one or more depressions,
   wherein at least one molded feature in said walls of said mounting opening engages said component to align said component in said mounting opening, said at least one molded feature comprising two elongated cantilevered snap-tabs, one of which engages with a pin extended from a back surface of a finish trim plate of said at least one component to force said snap-tab into said depressions, the trim panel further comprising a lock cylinder assembly for secure retention of said component in said mounting opening, wherein the lock cylinder assembly comprises a lock cylinder connected to a locking bar wherein upon insertion of a key into the lock cylinder and rotation of the key in the cylinder causes the locking bar to move from a first unengaged position to a second position wherein the locking bar engages one of said one or more depressions.

8. The vehicle interior trim panel of claim 7, wherein said mounting opening molded feature comprises at least one fore-aft tongue-like molded projection in the walls of said mounting opening to align and fixedly retain said component within said mounting opening.

* * * * *